United States Patent Office
3,786,060
Patented Jan. 15, 1974

3,786,060
COMPOUNDS, 2-BIS(4-CHLOROPHENOXY)-ETHYL NICOTINATE, 2 - BIS(4 - CHLOROPHENOXY)-PROPYL DINICOTINATE AND 2-(3,4-DIMETHYL-6-ISOBORNYLPHENOXY)-ETHYL NICOTINATE
Jean Mardiguian and Pierre Fournier, Paris, France, assignors to Societe a Responsabilite Limitee dite: MARPHA Societe d'Etudes et d'Exploitation de Marques, Paris, France
No Drawing. Filed July 7, 1970, Ser. No. 53,001
Claims priority, application Great Britain, July 7, 1969, 34,221/69
Int. Cl. C07d 31/36
U.S. Cl. 260—295.5 R        4 Claims

ABSTRACT OF THE DISCLOSURE

Aryloxyalkyl nicotinates of formula

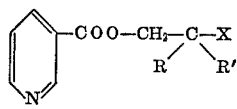

where R=H, hydroxymethyl, nicotinyloxymethyl or X, R'=H or X and X=phenoxy which may be substituted by up to 3 halogens, $C_1$–$C_4$ alkyl or isobornyl radicals, and acid addition salts thereof, prepared by reacting nicotinoyl chloride with the alcohol, are useful in the treatment of hypocholesterolaemia, hypolipidaemia and hepatic poisoning.

---

The present invention relates to new aryloxyalkyl nicotinates, their preparation and to pharmaceutical compositions containing them.

The aryloxyalkyl nicotinates of the present invention are those of the general formula:

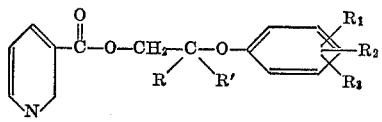

wherein $R_1$, $R_2$ and $R_3$, which may be identical or different, each represent hydrogen or halogen, or a lower alkyl radical having at most 4 carbon atoms, or an isobornyl radical, R represents hydrogen or an aryloxy radical

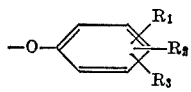

or a hydroxymethyl group —$CH_2OH$, or a nicotinoyloxymethylene group

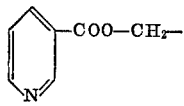

and R' represents hydrogen or an aryloxy radical

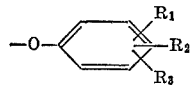

and non-toxic addition salts thereof.

The invention is particularly concerned with p-chlorophenoxyalkyl nicotinates of formula:

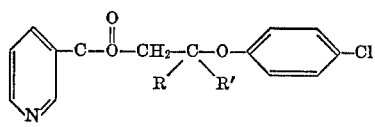

in which R and R' are defined as above, and non-toxic addition salts thereof.

These nicotinates and their non-toxic addition salts are useful especially as hypocholesterolaemia, hypolipidaemia and hepato-protective agents.

According to a further feature of the invention, these nicotinates can be prepared by condensing the nicotinic acid chloride, or its hydrochloride, with an alcohol of formula:

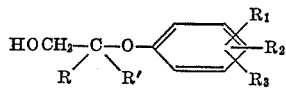

in which R, R', $R_1$, $R_2$ and $R_3$ are defined as above, in an aromatic solvent medium. The reaction is preferably carried out in the presence of an acid binding agent, e.g. a tertiary amine such as pyridine. The resulting nicotinate may be converted into its acid addition salt by reaction with an acid, e.g. hydrochloric acid, to give a pharmaceutically acceptable salt.

The compounds of the present invention, which are active orally, may be formulated into pharmaceutical compositions using the customary solid or liquid pharmaceutically acceptable excipients.

The examples which follow are given to illustrate the invention.

EXAMPLE 1

2-(p-chlorophenoxy)-ethyl nicotinate and its hydrochloride

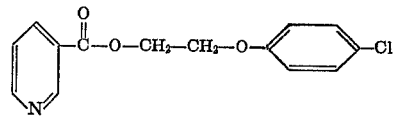

7.1 g. (0.04 mol) of nicotinic acid chloride hydrochloride, suspended in 100 ml. of anhydrous benzene, are added dropwise to 6.9 g. (0.04 mol) of p-chlorophenoxyethanol in 70 ml. of dry pyridine, stirred magnetically. At the end of the addition, the mixture is stirred for a further 15 minutes and is then left to stand at ambient temperature overnight. The pyridine and the benzene are evaporated slowly under reduced pressure (1 to 2 mm. Hg) on a hot water bath (100° C.).

Thereafter, the residue is rendered alkaline with a 10% aqueous solution of potassium bicarbonate and the base is extracted with chloroform 100 ml.). The combined chloroform extracts are washed with water, dried over magnesium sulphate and evaporated to dryness.

After recrystallization from isopropyl ether, the 2-(p-chlorophenoxy)-ethyl nicotinate obtained melts at 77±1° C. (in a capillary tube). Yield is 73% of theoretical.

The base is dissolved in 50 ml. of isopropyl alcohol, the solution is saturated with hydrogen chloride gas and ether then added until precipitation occurs.

This precipitate is recrystallized from isopropyl alcohol, to give 2-(p-chlorophenoxy)-ethyl nicotinate hydrochloride in the form of fine white needles melting at 154–155° C. (in a capillary tube), which are soluble in dilute acids.

Its ultraviolet spectrum shows characteristic absorption bands at 243 m$\mu$ and 287 m$\mu$. Its infrared spectrum shows characteristic absorption bands at 5.8$\mu$, 6.2$\mu$, 6.7$\mu$, 8.05$\mu$, 12$\mu$, 13.6$\mu$, and 14.3$\mu$.

*Analysis.*—Calcd. for $C_{14}H_{13}NO_3Cl_2$ (molecular weight=314) (percent): C, 53.52; H, 4.17; N, 4.46. Found (percent): C, 53.47; H, 4.05; N, 4.65.

2-(p-chlorophenoxy)-ethyl nicotinate and its addition salts with non-toxic acids, especially its hydrochloride, are useful as hypocholesterolaemia, hypolipidaemia and hepatoprotective agents.

EXAMPLE 2

2-(3,4-dimethyl-6-isobornyl-phenoxy)-ethyl nicotinate

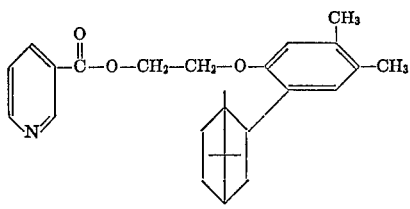

A suspension of 45 g. of nicotinoyl chloride in 100 ml. of anhydrous toluene is introduced into a well-dried 500 ml. flask protected against moisture by a calcium chloride tube. 15 g. of 2-(3,4-dimethyl-6-isobornyl-phenoxy)-ethanol dissolved in a mixture of 50 ml. of toluene and 50 ml. of anhydrous pyridine are slowly added with stirring to the nicotinoyl chloride. The flask is then cooled in an ice bath for 2 hours and left for 12 hours at ambient temperature. The insoluble material is filtered off, the filtrate is rendered alkaline with a saturated aqueous solution of sodium bicarbonate, the organic phase is washed with water until neutral and dried over sodium sulphate, and the solvent is then evaporated under reduced pressure.

Crystallization of the residue from absolute ethanol yields 17 g. of the desired product, M.P. 114° C.

Analysis.—Calcd. for $C_{26}H_{33}O_3N$ (percent): C, 76.7; H, 8.19; N, 3.44; O, 11.8. Found (percent): C, 76.3; H, 8.3; N, 3.5; O, 11.9. Infrared spectrum C=O band at 1718 cm.$^{-1}$.

EXAMPLE 3

2-bis(4-chlorophenoxy)-ethyl nicotinate

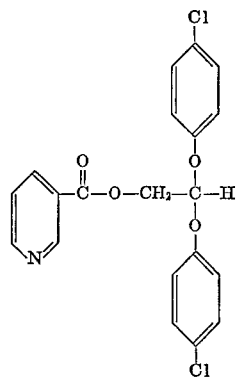

A suspension of 40 g. of nicotinoyl chloride in 100 ml. of anhydrous toluene is introduced into a perfectly dry 500 ml. flask protected against atmospheric moisture by a calcium chloride tube. A solution of 11 g. of 2-bis(4-chlorophenoxy)-ethanol in 50 ml. of anhydrous pyridine is added dropwise to this suspension. The materials are left in contact for 24 hours and the insoluble material is then filtered off. The filtrate is rendered alkaline by means of a saturated aqueous sodium bicarbonate solution, the organic phase is washed with water until a neutral pH is reached, and the solvent is then evaporated under reduced pressure. The residue is crystallized from cyclohexane.

13 g. of the desired ester are obtained, M.P. 90° C.

Analysis.—Calcd. for $C_{20}H_{15}O_4NCl$ (percent): C, 59.5; H, 3.74; N, 3.46; Cl, 17.6; O, 15.8. Found (percent): C, 59.2; H, 3.9; N, 3.2; Cl, 17.9; O, 15.8. Infrared spectrum C=O band at 1715 cm.$^{-1}$.

EXAMPLE 4

2-bis(4-chlorophenoxy)-propyl dinicotinate

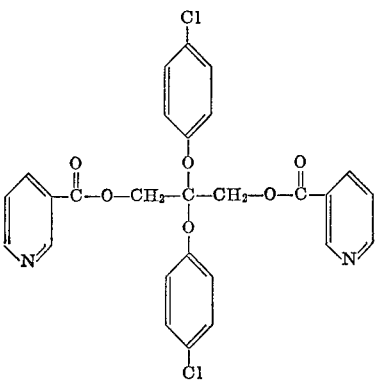

10 g. of nicotinoyl chloride suspended in 100 ml. of anhydrous pyridine are introduced into a 500 ml. flask which is dry and protected against moisture. 3.3 g. of 2-bis(4-chlorophenoxy)propanediol-1,3 dissolved in 40 ml. of pyridine are added slowly with stirring. After 12 hours reaction at ambient temperature, the insoluble matter is filtered off, the filtrate is neutralized with sodium carbonate and dried with moisture-absorbing paper, and the solvent is then driven off by evaporation under reduced pressure. Crystallization from a petroleum ether-benzene mixture yields 4.3 g. of the desired ester, M.P. 128° C.

Analysis.—Calcd. for $C_{27}H_{12}O_6N_2Cl_2$ (percent): C, 61; H, 2.26; N, 5.28; O, 18.1; Cl, 13.3. Found (percent): C, 60.5; H, 2.4; N, 5.1; O, 18.4; Cl, 13.6. Infrared spectrum C=O band at 1727 cm.$^{-1}$.

The pharmacological action of the products according to the present invention on lipid metabolism was studied on adult male white rats weighing about 220 g.; three experimental arrangements were used to demonstrate the action of these products with regard to the lipid metabolism (hypocholesterolaemia, hypolipidaemia and hepto-protective action).

(I) PROTECTIVE EFFECT AGAINST LIPID INFILTRATION OF ALCOHOLIC ORIGIN

Three groups of rats are used; a first group receives the product of Examples 1, 2 or 3 orally, a dose of 500 mg./kg. body weight (Ex. 1), and 825 mg./kg. body weight (Exs. 2 and 3); the $LD_{50}$ of the product of Example 1 in male mice is 1500 mg./kg. body weight. The other 2 groups receive at the same moment, an identical volume of 10% strength Senegal gum which was used to suspend the products to be studied. One hour later the animals in the first and second group receive 5.71 g./kg. of ethyl alcohol, as a 40% aqueous solution, administered orally in a volume equal to 18 ml./kg. The third group, the controls, receive Senegal gum only 17 hours later, the rats are killed by decapitation, the liver is rapidly removed and ground and its triglyceride content determined.

The action of the various compounds according to the invention was investigated by oral administration 1 hour before the ingestion of alcohol; the "control" and "alcohol" series. The results obtained are given in Table I.

TABLE I

| | Triglycerides in the liver (Mg./100 g.) |
|---|---|
| "Control" group | 156.6±16.19 |
| "Alcohol" only group | 386.3±24.72 |
| Product of Example 1 | 141.0±27.95 |
| "Control" group | 122.4±15.83 |
| "Alcohol" only group | 301.3±50.02 |
| Product of Example 2 | 271.11±43.94 |
| Product of Example 3 | 310.07±62.33 |

This table shows that the products according to the invention cause a marked lowering of the triglycerides content in the liver; this action is very marked for the product of Example 1.

(II) ANTAGONISTIC ACTION TOWARDS TRITON

Three groups of rats are used as in I above, the products of Examples 1–3 are administered orally at the rates indicated in (I) above and at the same moment, an identical volume of the aqueous solution of Senegal gum which serves as the solvent is administered to groups 2 and 3. One hour later the animals in groups 1 and 2 receive 200 mg./kg. of triton (superinone D-3-339-Winthrop), administered venously as a 2% strength solution in isotonic saline serum in a volume equal to 10 ml./kg. The third group, the controls, receive Senegal gum only 17 hours later, the rats are killed by decapitation; the blood which flows freely from the carotids and jugular veins is collected and rapidly centrifuged cold (0° C.); the liver is removed and ground. The optical density of the serum (an indication of its content in chylomicrons), its triglyceride content and its total cholesterol content, and the content of triglycerides in the liver, were determined. The results are given in Table II below.

TABLE II

| | TGS[1] | TGH[2] | Chylomicron | CTS[3] | CTE[4] |
|---|---|---|---|---|---|
| "Control" group | 51.4±10.65 | 136.2±18.15 | 0.150±0.013 | 0.70±0.032 | 0.50±0.024 |
| "Triton" only group | 1,422.7±103.96 | 120.06±3.63 | 0.906±0.104 | 3.23±0.218 | 1.32±0.079 |
| Product of Example 1 | 706.8±53.08 | 106.8±19.22 | 0.593±0.088 | 2.31±0.075 | 1.00±0.024 |
| "Control" group | 10.0±1.21 | 65.7±6.10 | 0.195±0.0149 | 0.84±0.050 | |
| "Triton" only group | 147.7±15.45 | 84.0±6.79 | 1.740±0.3300 | 2.81±0.178 | |
| Product of Example 2 | 104.5±20.54 | 83.5±9.40 | 1.328±0.2577 | 2.32±0.211 | |
| Product of Example 3 | 84.9±22.00 | 73.2±4.12 | 1.133±0.3629 | 2.14±0.253 | |

[1] TGS=Triglycerides in the serum, in mg./100 ml.
[2] TGH=Triglycerides in the liver, in mg./100 g.
[3] CTS=Total cholesterol in the serum.
[4] CTE=Total esterified cholesterol.

This table shows that the products of the invention cause a marked lowering of the content of triglycerides in the liver, of the triglycerides in the serum, and of the total cholesterol in the serum. This action is particularly marked for the product of Example 1.

(III) ANTAGONISTIC EFFECT TOWARDS THE TOXIC ACTION OF CARBON TETRACHLORIDE

Three groups of rats are used as in (I) above, the products of Examples 1–3 are administered orally at the rates indicated in (I) above and, at the same moment, an identical volume of the aqueous solution of Senegal gum is administered to groups 2 and 3. One hour later the animals in groups 1 and 2 receive 2.5 ml./kg. of a 50% strength solution of carbon tetrachloride in corn oil (representing 1.25 ml./kg. of carbon tetrachloride) administered orally. The third group, the controls, receive Senegal gum only. 10 hours later, the rats are killed by decapitation, and the blood is collected and centrifuged as previously. The liver is removed. The content of lactic dehydrogenase and of glutamopyruvic transaminase in the serum, the content of triglycerides in the liver, and the optical density of a trichloroacetic acid extract of the hepatic tissue were determined and the results are given below in Table III.

TABLE III

| | TGH[1] | SGPT[2] | LDH[3] |
|---|---|---|---|
| "Control" group | 147±11.57 | 33.7±8.46 | |
| "CCl₄" only group | 504.07±27.06 | 1,301.6±205.8 | |
| Product of Example 1 | 183.2±28.79 | 160.2±75.9 | |
| "Control" group | 72.6±7.99 | 18.6±1.64 | 0.452±0.0346 |
| "CCl₄" only group | 382.7±44.20 | 448.0±133.78 | 2.798±0.8972 |
| Product of Example 2 | 279.1±27.86 | 315.6±82.15 | 1.421±0.2877 |
| Product of Example 3 | 301.6±33.02 | 503.7±106.11 | 2.619±0.8507 |

[1] TGH=Triglycerides in the liver, in mg./100 ml.
[2] SGPT=Glutamo-pyruvic transaminase in the serum, mIU/ml.
[3] LDH=Lactico-dehydrogenase, in IU/ml.

The table shows that the action of the products according to the invention manifests itself through a very marked diminution of the triglycerides in the liver, of the lactico-dehydrogenase and of the glutamo-pyruvic transaminase in the serum.

We claim:

1. An aryloxyalkyl nicotinate which is 2-(3,4-dimethyl-6-isobornyl-phenoxy)-ethyl nicotinate, 2 - bis(4 - chlorophenoxy)-ethyl nicotinate, or 2 - bis(4-chlorophenoxy)-propyl dinicotinate.

2. 2-(3,4-dimethyl - 6 - isobornyl-phenoxy)-ethyl nicotinate.

3. 2-bis(4-chlorophenoxy)-ethyl nicotinate.

4. 2-bis(4-chlorophenoxy)-propyl dinicotinate.

References Cited

UNITED STATES PATENTS 3,622,587  11/1971  Carlson et al. _____ 260—295.5

FOREIGN PATENTS 1,479,204  3/1967  France _____ 260—295.5

OTHER REFERENCES

Chem. Abstracts, vol. 68, No. 21, 95703x, May 1968.

ALAN L. ROTMAN, Primary Examiner

U.S. Cl. X.R.

260—295.5 B; 424—266